(12) United States Patent
Chung et al.

(10) Patent No.: US 8,670,679 B2
(45) Date of Patent: Mar. 11, 2014

(54) COHERENT OPTICAL RECEIVING APPARATUS AND OPTICAL SIGNAL PROCESSING METHOD

(75) Inventors: Hwan Seok Chung, Daejeon (KR); Sun Hyok Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 134 days.

(21) Appl. No.: 13/231,328

(22) Filed: Sep. 13, 2011

(65) Prior Publication Data

US 2012/0070149 A1 Mar. 22, 2012

(30) Foreign Application Priority Data

Sep. 17, 2010 (KR) ........................ 10-2010-0091527

(51) Int. Cl.
*H04B 10/06* (2011.01)
(52) U.S. Cl.
USPC .......................................... 398/208; 398/202
(58) Field of Classification Search
USPC ................................................ 398/202–214
See application file for complete search history.

(56) References Cited

U.S. PATENT DOCUMENTS

| 6,671,079 | B2 * | 12/2003 | Fuller et al. ................... 359/264 |
| 6,763,072 | B1 * | 7/2004 | Matsui et al. .................. 375/260 |
| 6,917,031 | B1 * | 7/2005 | Sun et al. .................. 250/214 R |
| 7,330,666 | B1 * | 2/2008 | Koley ............................ 398/188 |
| 7,333,736 | B2 * | 2/2008 | Sardesai et al. ............... 398/201 |
| 7,477,852 | B2 * | 1/2009 | Agarwal et al. ............... 398/210 |
| 7,555,227 | B2 | 6/2009 | Bontu et al. |
| 8,112,001 | B2 * | 2/2012 | Lowery et al. ................ 398/158 |
| 8,306,418 | B2 * | 11/2012 | Cai .................................. 398/29 |
| 8,478,137 | B2 * | 7/2013 | Komaki et al. ............... 398/208 |
| 2001/0015845 | A1 * | 8/2001 | Ito et al. ......................... 359/189 |
| 2008/0063396 | A1 * | 3/2008 | Yu et al. .......................... 398/42 |
| 2008/0205905 | A1 | 8/2008 | Tao et al. |
| 2008/0267638 | A1 * | 10/2008 | Nakashima et al. .......... 398/208 |
| 2009/0074428 | A1 * | 3/2009 | Liu ................................ 398/208 |
| 2009/0190926 | A1 * | 7/2009 | Charlet et al. .................. 398/74 |
| 2009/0317092 | A1 * | 12/2009 | Nakashima et al. .......... 398/204 |
| 2010/0329697 | A1 * | 12/2010 | Koizumi et al. .............. 398/208 |
| 2011/0103529 | A1 * | 5/2011 | Kim et al. ..................... 375/344 |
| 2012/0134684 | A1 * | 5/2012 | Koizumi et al. .............. 398/202 |

OTHER PUBLICATIONS

Chung et al, Effect of IQ Mismatch Compensation in an Optical Coherent OFDM Receiver, Mar. 1, 2010, IEEE Photonics Technology Letters, vol. 22, No. 5, pp. 308-310.*

(Continued)

*Primary Examiner* — Ken Vanderpuye
*Assistant Examiner* — Dibson Sanchez
(74) *Attorney, Agent, or Firm* — Rabin & Berdo, P.C.

(57) ABSTRACT

Provided is a coherent optical receiving apparatus and an optical signal processing method. The coherent optical receiving apparatus may include an optical hybrid unit to generate an optical signal by combining a first optical signal inputted from an optical transmitting apparatus and a second optical signal inputted from a local oscillator, a polarization demuxer to demultiplex the optical signal outputted from the optical hybridizing unit, a frequency offset compensator to estimate a frequency offset of at least one of even-numbered samples and odd-numbered samples, and to compensate for a frequency offset of the even-numbered samples and a frequency offset of the odd-numbered samples using the at least one estimated frequency offset, and a carver distortion compensator to compensate for phase distortions of the samples for which the compensation for the frequency offset is performed, the phase distortions being generated by the optical transmitting apparatus.

14 Claims, 10 Drawing Sheets

(56) References Cited

OTHER PUBLICATIONS

Fatadin et al, Compensation of Quadrature Imbalance in an Optical QPSK Coherent Receiver, Oct. 15, 2008, IEEE Photonics Technology Letters, vol. 20, No. 20, pp. 1733-1735.*

Ly-Gagnon et al, Coherent Detection of Optical Quadrature Phase-Shift Keying Signals With Carrier Phase Estimation, Jan. 2006, Journal of Lightwave Technology, vol. 24, No. 1, pp. 12-21.*

Leven et al, Real-time implementation of 4.4 Gbit/s QPSK intradyne receiver using field programmable gate array, Nov. 23, 2006, Electronics Letters vol. 42 No. 24.*

* cited by examiner

<NON-IDEAL>

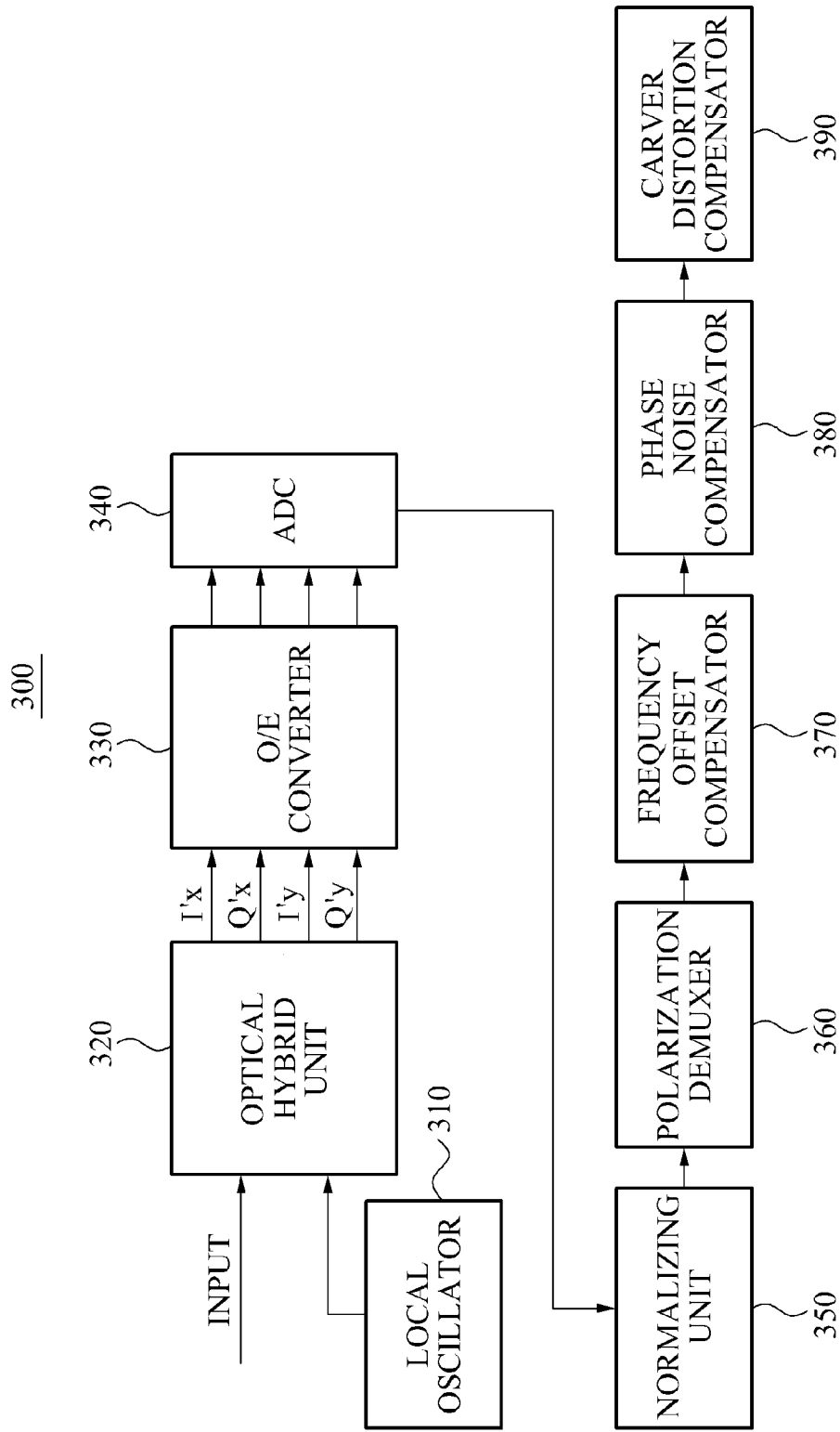

< CONSTELLATION BEFORE COMPENSATION >

< CONSTELLATION AFTER COMPENSATION >

COHERENT OPTICAL RECEIVING APPARATUS AND OPTICAL SIGNAL PROCESSING METHOD

CROSS-REFERENCE TO RELATED APPLICATION

This application claims the benefit of Korean Patent Application No. 10-2010-0091527, filed on Sep. 17, 2010, in the Korean Intellectual Property Office, the disclosure of which is incorporated herein by reference.

BACKGROUND

1. Field of the Invention

The present invention relates to a coherent optical receiving apparatus and an optical signal processing method, and more particularly, to a coherent optical receiving apparatus and an optical signal processing method that accurately estimates a frequency offset to compensate for a phase distortion of the optical signal.

2. Description of the Related Art

A return-to-zero (RZ) pulse carver may be included in a transmitting apparatus to be used for optical transmission. The RZ pulse carver may be configured using a Mach-Zehnder (MZ) optical modulator, to convert a waveform to a RZ pulse. When an intensity of a provided sine-wave is the same as a voltage required by the RZ pulse carver, the RZ pulse carver may be an ideal RZ pulse carver. The provided sine-wave may be accurately divided into ½ sine-waves and provided to an internal electrode of the MZ optical modulator. In this example, phases of the provided ½ sine-waves may be the same. An intensity of the provide ½ sine-waves may be the same as the voltage required by the RZ pulse carver.

However, an actually used RZ pulse carver is different from an ideal RZ pulse carver. Therefore, a phase distortion may occur in an optical pulse generated by the RZ pulse carver. The phase distortion may deteriorate a performance of a phase-modulated signal. The phase distortion may cause an error in estimating a frequency offset that is a difference in frequency between a laser used by a transmitting apparatus and a laser used by a receiving apparatus.

SUMMARY

An aspect of the present invention provides a coherent optical receiving apparatus and an optical processing method that may accurately estimate a frequency to prevent an optical signal processing from being affected by a phase distortion generated due to a return-to-zero (RZ) pulse carver, may compensate for a phase distortion, and may provide a stable performance.

According to an aspect of the present invention, there is provided a coherent optical receiving apparatus, the apparatus including an optical hybridizing unit to generate an optical signal by combining a first optical signal inputted from an optical transmitting apparatus and a second optical signal inputted from a local oscillator, a polarization demuxer to demultiplex the optical signal outputted from the optical hybridizing unit to output samples where an x polarized light and a y polarized light are separated from each other, a frequency offset compensator to estimate a frequency offset of at least one of even-numbered samples and odd-numbered samples from among the samples inputted from the polarization demuxer, and to compensate for a frequency offset of the even-numbered samples and a frequency offset of the odd-numbered samples using the at least one estimated frequency offset, and a carver distortion compensator to compensate for phase distortions of the samples for which the compensation for the frequency offset is performed, the phase distortions being generated by the optical transmitting apparatus.

The frequency offset compensator may estimate a frequency offset of the even-numbered samples, based on an average of phase changes generated by the even-numbered samples, and may estimate a frequency offset of the odd-numbered samples, based on an average of phase changes generated by the odd-numbered samples.

The frequency offset compensator estimates a frequency offset of the even-numbered samples and a frequency offset of the odd-numbered samples, and may compensate for the frequency offset of the even-numbered samples and the frequency offset of the odd-numbered samples, based on an average value of the estimated frequency offset of the even-numbered samples and the estimated frequency offset of the odd-numbered samples.

The carver distortion compensator may compensate for phase distortions with respect to the even-numbered samples and phase distortions with respect to the odd-numbered samples.

The carver distortion compensator may compensate for the phase distortions with respect to the even-numbered samples, based on an average amount of the phase distortions calculated with respect to the even-numbered samples, and may compensate for the phase distortions with respect to the odd-numbered sample, based on an average amount of the phase distortions calculated with respect to the odd-numbered samples.

The carver distortion compensator may compensate for a phase distortion generated by an RZ pulse carver of the optical transmitting apparatus.

The optical hybridizing unit outputs, to the polarization demuxer, the optical signal where the x polarized light and the y polarized light not separated.

The samples outputted from the polarization demuxer may include an in-phase channel component where the x polarized light and the y polarized light are separated from each other, and may include an quadrature phase channel component where the x polarized light and the y polarized light are separated from each other.

According to an aspect of the present invention, there is provided an optical signal processing method of a coherent optical receiving apparatus, the method including generating an optical signal by combining a first optical signal inputted from an optical transmitting apparatus and a second optical signal inputted from a local oscillator, outputting samples where an x polarized light and a y polarized light are separated from each other by demultiplexing the optical signal outputted from the optical hybridizing unit, estimating a frequency offset of at least one of even-numbered samples and odd-numbered samples from among the inputted samples, compensating for a frequency offset of the even-numbered samples and a frequency offset of the odd-numbered samples using the at least one estimated frequency offset, and compensating for phase distortions of the samples for which the compensation for the frequency offset is performed, the phase distortions being generated by the optical transmitting apparatus.

The estimating may include estimating a frequency offset of the even-numbered samples, based on an average of phase changes generated by the even-numbered samples, and estimating a frequency offset with respect to the odd-numbered samples, based on an average of phase changes generated by the odd-numbered samples.

The compensating may include estimating a frequency offset of the even-numbered samples and a frequency offset of the odd-numbered samples, and compensating for the frequency offset of the even-numbered samples and the frequency offset of the odd-numbered samples, based on an average value of the estimated frequency offset of the even-numbered sample and the estimated frequency offset of the odd-numbered samples.

The compensating may include compensating for phase distortions with respect to the even-numbered samples and phase distortions with respect to the odd-numbered samples.

The compensating may include compensating for the phase distortions with respect to the even-numbered samples, based on an average amount of the phase distortions calculated with respect to the even-numbered samples, and compensating for the phase distortions with respect to the odd-numbered sample, based on an average amount of the phase distortions calculated with respect to the odd-numbered samples.

The compensating may include compensating for a phase distortion generated by an RZ pulse carver of the optical transmitting apparatus.

Additional aspects, features, and/or advantages of the invention will be set forth in part in the description which follows and, in part, will be apparent from the description, or may be learned by practice of the invention.

Effect

According to example embodiments, a frequency offset that is not affected by a phase distortion generated due to a return-to-zero (RZ) pulse carver may be accurately estimated.

According to example embodiments, compensation for a phase distortion generated due to an RZ pulse carver may be performed based on accurately estimated frequency offset and thus, a coherent optical receiving apparatus that provides stable performance may be provided.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 is a diagram illustrating a coherent optical receiving apparatus according to an embodiment of the present invention;

DETAILED DESCRIPTION

Figure 1:
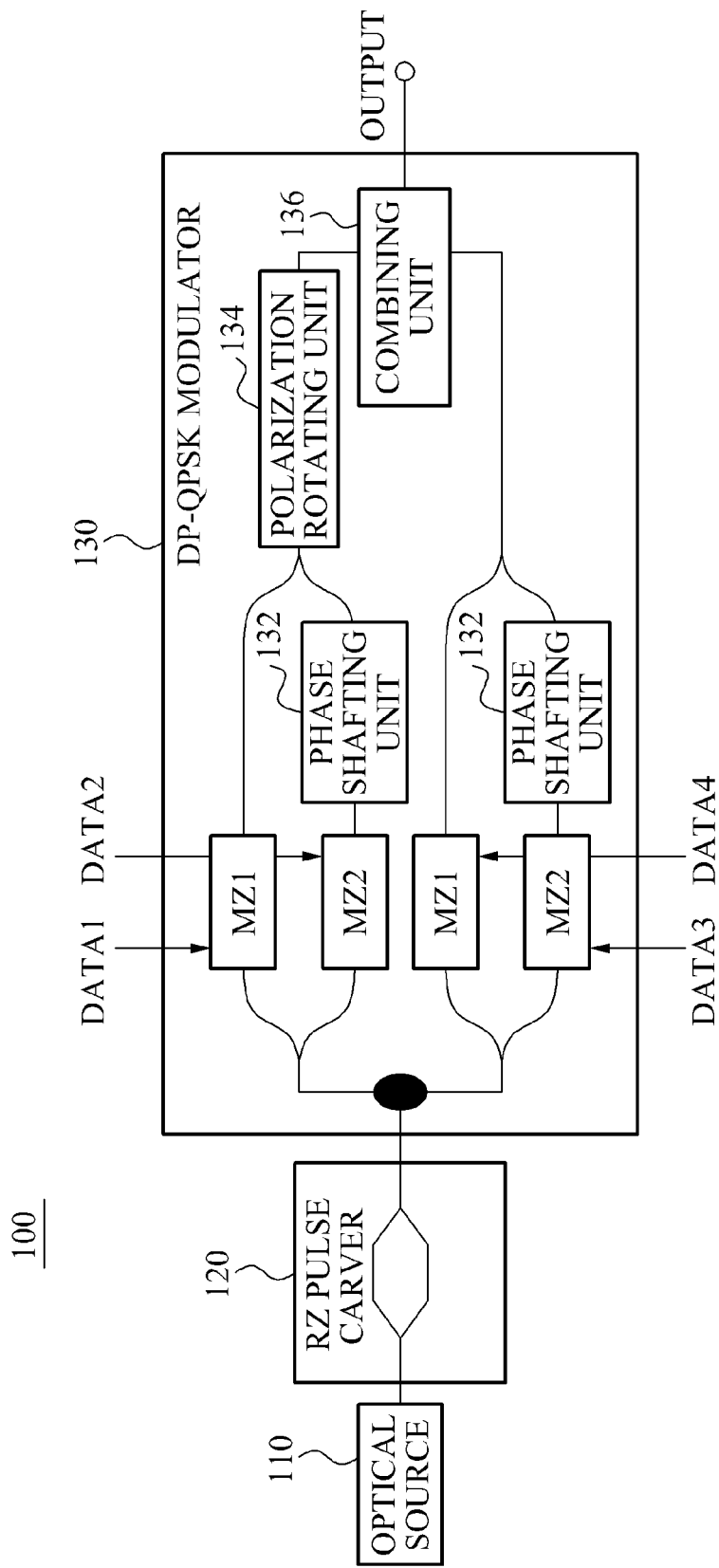
FIG. 1 is a diagram illustrating a dual polarization quadrature phase shift keying (DP-QPSK) optical transmitting apparatus that utilizes two polarized lights according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a dual polarization quadrature phase shift keying (DP-QPSK) optical transmitting apparatus 100 that utilizes two polarized lights according to an embodiment of the present invention.

Referring to FIG. 1, the DP-QPSK optical transmitting apparatus 100 may modulate a phase of an optical signal to transmit information. The above described scheme may perform relatively long distance transmission compared with an On-Off keying scheme that modulates an intensity of the optical signal. The DP-QPSK optical transmitting apparatus 100 may use a Mach-Zehnder (MZ) modulator to modulate the phase of the optical signal based on an inputted electric data, and may use a pulse as an optical source, as opposed to a continuous wave (CW), to perform data modulation. When the pulse is used, as opposed to the CW, a margin of an optical signal to noise ratio (OSNR) may increase.

Referring to FIG. 1, the DP-QPSK optical transmitting unit 100 may include an optical source 110, a return-to-zero (RZ) pulse carver 120, and a DP-QPSK modulator 130.

The optical source 110 may output an optical signal. For example, the optical source may be a laser diode (LD) that outputs a laser.

The RZ pulse carver 120 may receive the optical signal outputted from the optical source 110 and may modulate the received optical signal to a pulse. A duty cycle of each pulse generated by the RZ pulse carver 120 may be 33%, 50%, or 66%, based on a frequency of a provided sine-wave and a state of a bias of an MZ modulator.

The DP-QPSK modulator 130 may include at least two MZ modulators, for example, an MZ1 and an MZ2, a phase shifting unit 132, a polarization rotating unit 134, and a combining unit 136. Each of the at least two MZ modulators may perform QPSK modulation of inputted pulses using electric signals, such as data 1, data 2, data 3, and data 4. Each of the at least two modulators may modulate phases of the inputted pulses to zero or $\pi$ based on electric signals. The electric signals may respectively have different patterns generated by a precoder.

A phase shifting unit 132 may phase-shift a signal outputted from the MZ1 by $\pi/2$.

The polarization rotating unit 134 may rotate, at a predetermined angle, a polarized light of an optical signal outputted from the phase shifting unit 132.

The combining unit 136 may combine an optical signal outputted from the polarization rotating unit 134 and an optical signal outputted from the MZ2, to generate a DP-QPSK signal. An optical signal outputted from the combining unit 136 may be transmitted to a coherent optical receiving apparatus 300.

When the RZ pulse carver 120 is an ideal RZ pulse carver, a provided sine-wave pulse may be accurately divided into ½ sine-waves and may be provided to an internal electrode of the at least two MZ modulators.

Figure 2A:
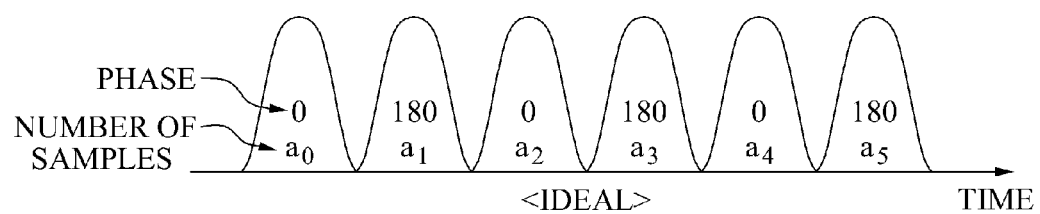
FIG. 2A is a diagram illustrating a waveform of a return-to-zero (RZ) pulse where a phase distortion does not occur according to an embodiment of the present invention.

FIG. 2A illustrates a waveform of an RZ pulse where a phase distortion does not occur according to an embodiment of the present invention.

Referring to FIG. 2A, the waveform of the RZ pulse may be a waveform of a pulse having a duty cycle of 66%. '0' and '180' may denote a phase of the RZ pulse, and $a_n$, (n=0, 1, 2, 3, ... ) may denote an $n^{th}$ sample or an $n^{th}$ bit. An ideal RZ pulse of 66% may have a pulse waveform where a phase is changed by 180 degrees at two samples intervals. For example, phases of even-numbered samples, for example, $a_0$, $a_2$, and $a_4$ are 0 degrees, and phases of odd-numbered samples, for example, $a_1$, $a_3$, and $a_5$ are 180 degrees. The phases of the even-numbered samples and the phases of the odd-numbered sample may be exchanged with each other.

Figure 2B:
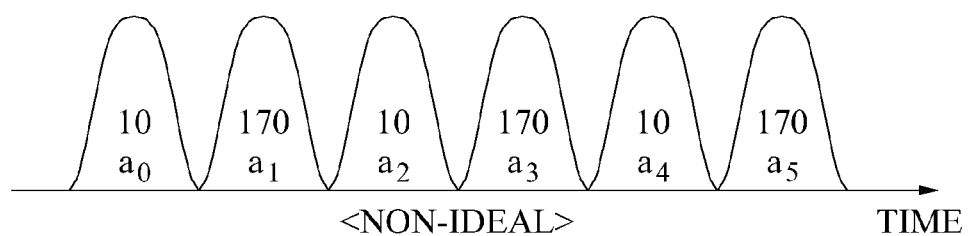
FIG. 2B is a diagram illustrating a waveform of an RZ pulse where a phase distortion occurs according to an embodiment of the present invention.

FIG. 2B illustrates a waveform of an RZ pulse where a phase distortion occurs according to an embodiment of the present invention.

Referring to FIG. 2B, the waveform of the RZ pulse may be a waveform of a pulse having a duty cycle of 66%. The RZ pulse carver 120 may be non-ideal. In this example, even-numbered samples, such as $a_0$, $a_2$, and $a_4$ and odd-numbered samples, such as $a_1$, $a_3$, and $a_5$, may cause different phase distortions. The even-numbered samples have distortions of +10 degrees and the odd-numbered samples have distortions of −10 degrees. The coherent optical receiving apparatus 300 may compensate for the phase distortions.

FIG. 3 illustrates a coherent optical receiving apparatus 300 according to an embodiment of the present invention.

The coherent optical receiving apparatus 300 may receive an optical signal from the optical transmitting apparatus 100 of FIG. 1 via an optical line. The coherent optical receiving apparatus 300 may recover a polarized light or a phase of the optical signal to compensate for a defect caused by the optical transmitting apparatus 100 or the optical line. Examples of the defect may include a frequency offset, a phase distortion, and the like.

Referring to FIG. 3, the coherent optical receiving apparatus 300 may include a local oscillator 310, an optical hybridizing unit 320, an optical to electrical (O/E) converter 330, an analog to digital converter (ADC) 340, a normalizing unit 350, a polarization demuxer 360, a frequency offset compensator 370, a phase noise compensator 380, and a carver distortion compensator 390.

The local oscillator 310 may output a second optical signal, such as a laser.

The optical hybrid unit 320 may combine a first optical signal inputted from the optical transmitting apparatus 100 and the second optical light inputted from the local oscillator 310, and may separate the combined optical signal into an in-phase channel component and a quadrature phase channel component. When the inputted optical signal is polarization-multiplexed in the optical transmitting apparatus 100, the optical hybrid unit 320 may separate the combined optical signal into the in-phase channel component including an x polarized light and a y polarized light, and the quadrature phase channel component including an x polarized light and a y polarized light. An optical signal outputted from the optical hybrid unit 320 includes an x polarized light and a y polarized light, and may be constituted by I'x, Q'x, I'y, and Q'y. I'x and I'y may denote the in-phase channel component including an x polarized light and a y polarized light. Q'x and Q'y may denote the quadrature phase channel component including an x polarized light and a y polarized light.

The O/E converter 330 may convert the optical signal inputted from the optical hybrid unit 320 to an electric signal.

The ADC 340 may convert the electric signal inputted from the O/E converter 330 to a digital signal.

The normalizing unit 350 may normalize four digital signals inputted from the ADC 340.

The polarization demuxer 360 may demultiplex the normalized signals to output samples where an x polarized light and a y polarized light are separated from each other. The optical signal outputted from the optical hybridizing unit 320 may include an x polarized light and a y polarized light which not separated from each other. However, the samples outputted from the polarization demuxer 360 may be a signal where the x polarized light and the y polarized light are separated from each other, and the samples may be constituted by Ix, Qx, Iy, and Qy. Ix may denote an in-phase channel component of the x polarized light, Qx may denote a quadrature phase channel component of the x polarized light, Iy may denote an in-phase channel component of the y polarized light, and Qy may denote a quadrature phase channel component of the y polarized light.

When polarized lights are separated by the polarization demuxer 360, the frequency offset compensator 370 may estimate a frequency offset to compensate for a phase change generated by a difference between a frequency of the laser of the optical transmitting apparatus 100 and a frequency of the second optical signal of the local oscillator 310.

The frequency offset compensator 370 may estimate a frequency offset of at least one of even-numbered samples and odd-numbered samples from among samples inputted from the polarization demuxer 360, and may compensate for a frequency offset of the even-numbered samples and a frequency offset the odd-numbered samples, that is, a frequency offset of all samples, based on the at least one estimated frequency offset. The even-numbered samples may be samples inputted in an even-numbered order, and the odd-numbered samples may be samples inputted in an odd-numbered order.

A case where the frequency offset compensator 370 estimates a frequency offset using only the even-numbered samples is described below.

Equation 1 may calculate an average number of phase changes generated due to the frequency offset, based on only even-numbered samples. The frequency offset compensator 370 may estimate a frequency offset of the even-numbered sample based on the average number of the phase changes that is calculated by Equation 1.

$$ap_{even} = \frac{1}{4}\arg\left(\sum_{n=2}^{N}(a_n a_{n+1}^*)^4\right), n = 2k, k = 1, 2, 3, \ldots N/2 \quad [\text{Equation 1}]$$

In Equation 1, $ap_{even}$ may denote the average of phase changes generated due to the frequency offset of the even-numbered samples, * may denote a complex conjugate number, and arg may denote a rule to be used for calculating a phase. $a_n$ may denote a complex number of an $n^{th}$ sample generated by the polarization demuxer 360, $a_{n+1}$ may denote a complex number of an adjacent sample that is successively inputted after $a_n$. For example, $a_n$ may have a value of Ix+jQx or a value of Iy+jQy.

To calculate the frequency offset of the even-numbered samples, the frequency offset compensator 370 may multiply a complex number of a subsequent sample of two adjacent samples by a current sample and may raise the multiplied value to the $4^{th}$ power. When the optical signal is modulated in the optical transmitting apparatus 100 based on a QPSK scheme, the multiplied value may be raised to the $4^{th}$ power, and when the optical signal is modulated based on a scheme different from the QPSK scheme, an equation different from an equation that raises the multiplied value to the $4^{th}$ power, may be applied.

The frequency offset estimating unit 370 may calculate an average of phase changes generated due to the frequency offset of the even-numbered samples, based on Equation 1 using the even-numbered samples. Therefore, even though a phase distortion occurs due to the RZ pulse carver 120, the frequency offset estimating unit 370 may accurately estimate a frequency offset. Phase distortions occurring in the even-numbered samples and phase distortions occurring in odd-numbered samples may be the same and thus, a difference between the phase distortions of the even-numbered samples and the phase distortions of the odd-numbered samples may be zero. Accordingly, a phase distortion occurring due to a pulse carver may not affect the frequency offset estimation.

When the average number of phase changes is calculated based on Equation 1, the frequency offset compensator 370 may divide $ap_{even}$ by an even-numbered sample interval $t_e$ to estimate a frequency offset ($f_e$) of the even-numbered samples. $t_e$ may be double the inverse number of a sampling frequency used by the ADC 340.

Subsequently, a case where the offset compensator 370 estimates a frequency offset using only odd-numbered samples may be described.

Equation 2 may calculate an average number of phase changes generated due to a frequency offset, based on only odd-numbered samples. The frequency offset compensator 370 may estimate a frequency offset of the odd-numbered sample based on the average number of phase changes that is calculated by Equation 2.

$$ap_{odd} = \frac{1}{4}\arg\left(\sum_{n=1}^{N-1}(a_n a_{n+1}^*)^4\right), n = 2k - 1, k = 1, 2, 3, \ldots N/2 \quad \text{[Equation 2]}$$

In Equation 2, $ap_{odd}$ may denote an average number of phase changes generated due to the frequency offset of the odd-numbered samples, and elements described with reference to Equation 1 are omitted.

The frequency offset estimating unit 370 may calculate an average of phase changes generated due to the frequency offset of the odd-numbered samples, based on Equation 2 using the odd-numbered samples. Therefore, even though a phase distortion occurs due to the RZ pulse carver 120, the frequency offset estimating unit 370 may accurately estimate a frequency offset. Phase distortions occurring in even-numbered sample and phase distortions occurring in the odd-numbered samples may be the same and thus, a difference between the phase distortions of the even-numbered samples and the phase distortions of the odd-numbered samples may be zero. Accordingly, a phase distortion occurring due to a pulse carver may not affect the frequency offset estimation.

When the average number of phase changes is calculated based on Equation 2, the frequency offset compensator 370 may divide $ap_{odd}$ by an odd-numbered sample interval ($t_o$) to estimate a frequency offset ($f_o$) of the odd-numbered samples. $t_o$ may be double the inverse number of a sampling frequency used by the ADC 340.

Figure 4:
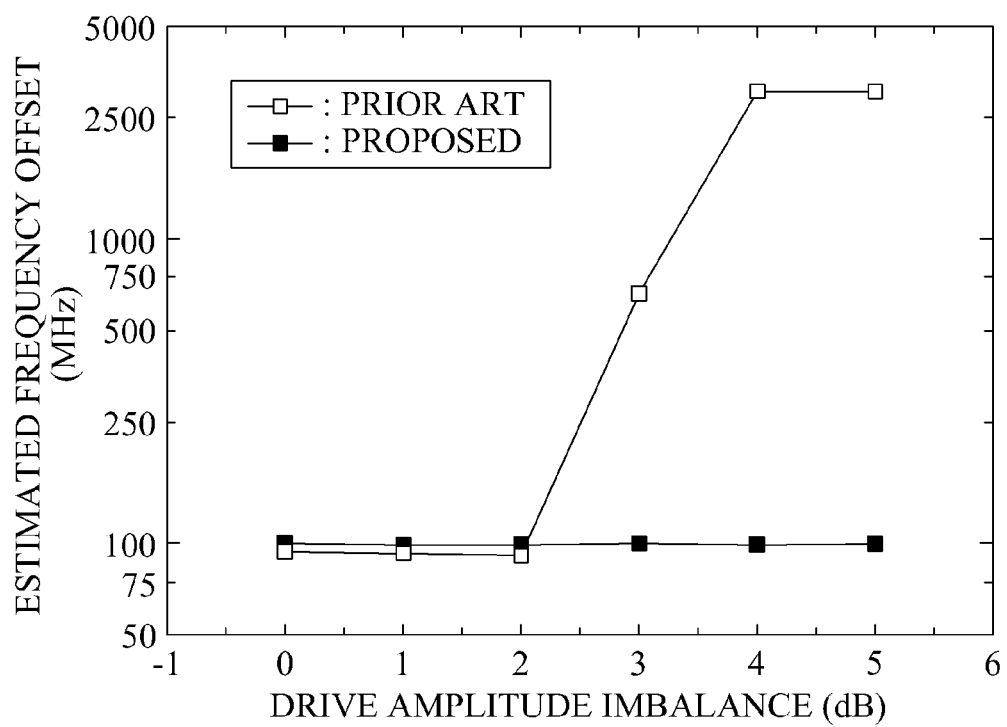
FIG. 4 is a diagram illustrating an example of a frequency offset estimated by a frequency offset compensator according to an embodiment of the present invention.

FIG. 4 illustrates an example of a frequency offset estimated by the frequency offset compensator 370 according to an embodiment of the present invention.

Referring to FIG. 4, when a drive amplitude imbalance of the RZ pulse carver 120 increases, a change in a frequency offset estimated based on a conventional scheme may be high. Therefore, an estimation error may increase. However, a frequency offset estimated based on at least one of Equation 1 and Equation 2 may be about 100 MHz and may be accurately estimated.

The frequency offset compensator 370 may compensate for a frequency offset of all samples based on one of an estimated frequency offset of even-numbered samples and an estimated frequency offset of odd-numbered samples. For example, the frequency offset compensator 370 may subtract the estimated frequency offset of the even-numbered offset from an original signal of the all samples to compensate for the frequency offset. For example, the original signal may be $a_n$. The frequency offset compensator 370 may subtract the estimated frequency offset of the odd-numbered offsets from the original signal of the all samples to compensate for the frequency offset.

The frequency offset compensator 370 may compensate for the frequency offset with respect to the all samples using an average value of the frequency offset of the even-numbered samples and the frequency offset of the odd-numbered samples. A difference between the frequency offset of the even-numbered samples and the frequency offset of the odd-numbered samples is insignificant.

Referring again to FIG. 3, the phase noise compensator 380 may remove a number of a phase changes occurring due to linewidth of laser from a signal for which compensation for a frequency offset is performed.

The carver distortion compensator 390 may compensate for a phase distortion occurring due to the optical transmitting apparatus 100, with respect to the samples for which compensation for a frequency offset is performed. The carver distortion compensator 390 may compensate for a phase distortion occurring due to the RZ pulse carver 120. The phase distortion occurring due to the RZ pulse carver 120 may be different for each of the even-numbered samples and the odd-numbered samples. Therefore, the carver distortion compensator 390 may calculate an amount of phase distortions occurring in the even-numbered samples and an amount of phase distortions occurring in the odd-numbered samples, and may compensate for the original signal using the calculated amount of phase distortions and thus, may compensate for the phase distortion due to the RZ pulse carver 120.

First, the carver distortion compensator 390 may remove phase distortion generated due to data modulation by raising the sample to the $4^{th}$ power as expressed by Equation 3.

$$c_k = \frac{1}{4}\arg(a_k^4), k = 0, 1, 2, 3, \ldots N \quad \text{[Equation 3]}$$

In Equation 3, $c_k$ may denote an amount of phase distortion of a $k^{th}$ sample, $a_k$ may denote a $k^{th}$ signal inputted from the phase noise compensator 380, that is, the $k^{th}$ sample. When the optical signal is modulated in the optical transmitting apparatus 100 based on a QPSK scheme, an equation of raising to the $4^{th}$ power may be used, and when the optical signal is modulated based on a scheme different from the QPSK scheme, an equation different from the equation of raising to the $4^{th}$ power may be applied.

The carver distortion compensator 390 may separate the amount of phase distortions calculated by Equation 3 into an amount of phase distortions occurring in the even-numbered samples and an amount of phase distortions occurring in the odd-numbered samples. The carver distortion compensator 390 may calculate an average amount of phase distortions of the even-numbered sample based on Equation 4, and may calculate an average amount of phase distortions of the odd-numbered samples based on Equation 5.

$$p_{even} = \frac{2}{N} \sum_{k=0}^{N} c_k, k = 0, 2, 4, \ldots N \quad \text{[Equation 4]}$$

$$p_{odd} = \frac{2}{N} \sum_{k=1}^{N-1} c_k, k = 1, 3, 5, \ldots N-1 \quad \text{[Equation 5]}$$

In Equation 4 and Equation 5, $p_{even}$ may denote the average amount of phase distortions of the even-numbered samples, $p_{odd}$ may denote the average amount of phase distortions of the odd-numbered sample, N may denote a total number of samples, and $c_k$ may denote a value calculated by Equation 3.

The carver distortion compensator 390 may compensate for the phase distortions of the even-numbered samples based on $p_{even}$ calculated based on Equation 4, and the phase distortions of the odd-numbered samples based on $p_{odd}$ calculated based on Equation 5. For example, when the $k^{th}$ sample ($a_k$) inputted from the phase noise compensator 380 is an even-numbered sample, the carver distortion compensator 390 may subtract $p_{even}$ calculated by Equation 4 from the $a_k$ to compensate for a phase distortion.

Figure 5A:
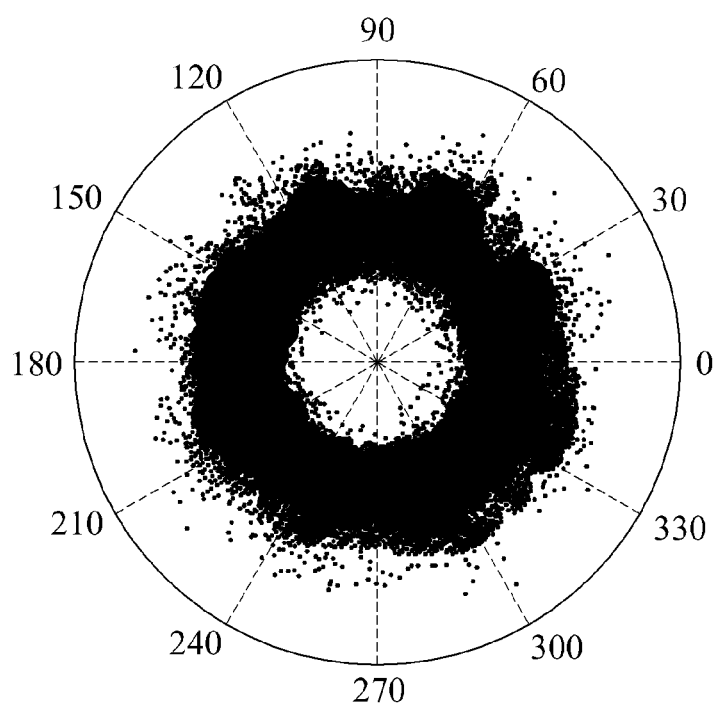
FIG. 5A is a diagram illustrating a constellation before compensation for a phase distortion according to an embodiment of the present invention.
Figure 5B:
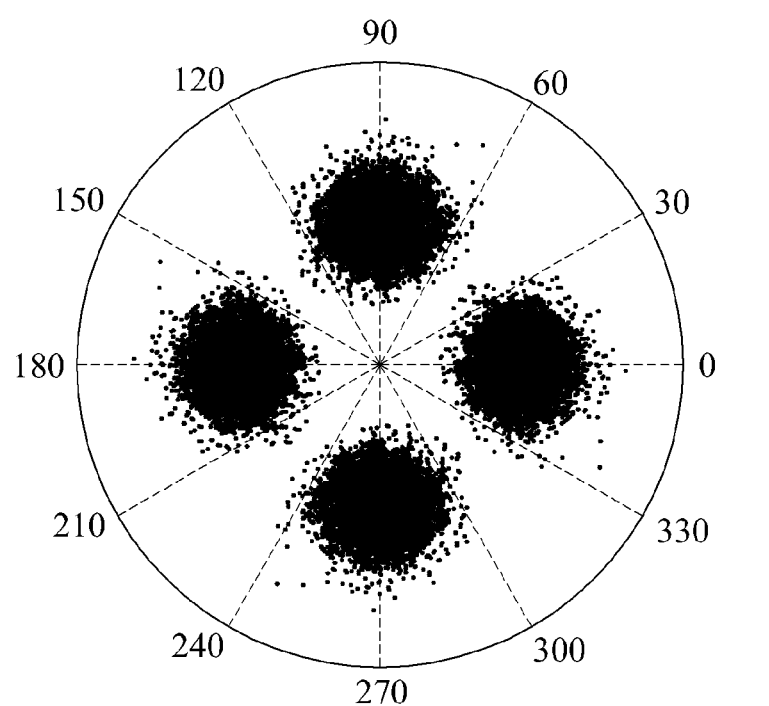
FIG. 5B is a diagram illustrating a constellation after compensation for a phase distortion according to an embodiment of the present invention.

FIG. 5A illustrates a constellation before compensation for a phase distortion, and FIG. 5B illustrates a constellation after compensation for a phase distortion.

Referring to FIG. 5A and FIG. 5B, a distorted constellation before the compensation may have a format of a QPSK signal after the compensation.

Figure 6:
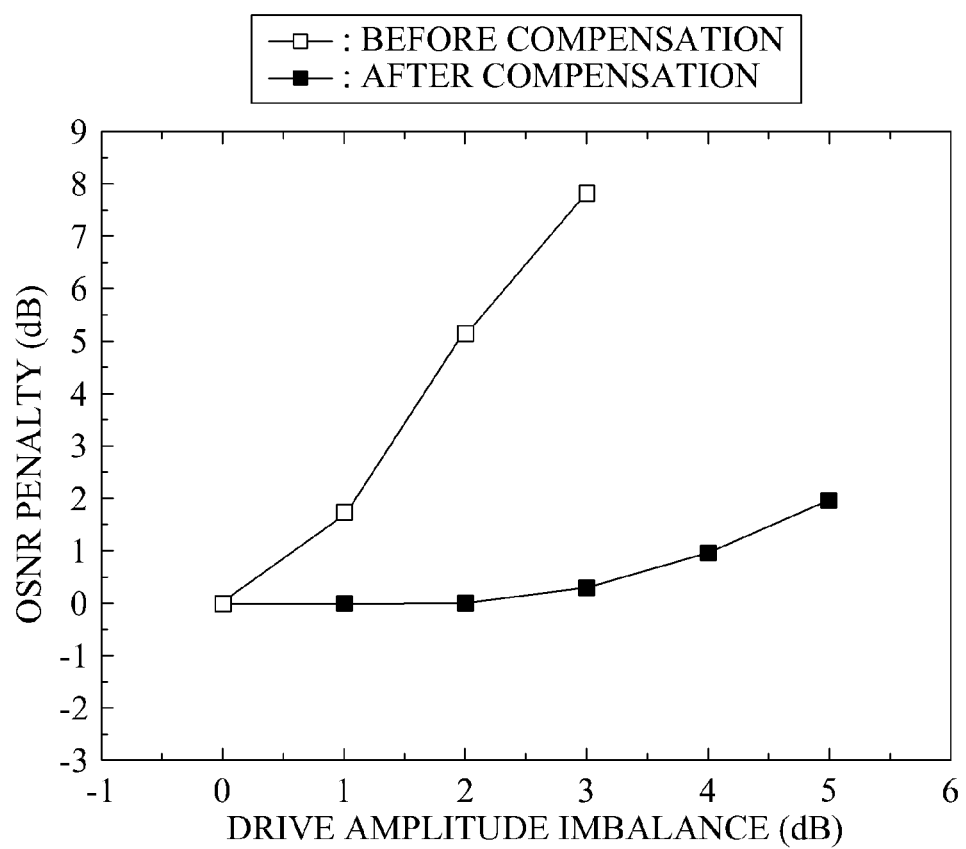
FIG. 6 is a diagram illustrating an optical signal to noise ratio (OSNR) penalty before compensation for a phase distortion and an OSNR penalty after the compensation for the phase distortion, when an optical transmitting apparatus performs DP-QPSK modulation of an optical signal using an RZ pulse of 66% according to an embodiment of the present invention.

FIG. 6 illustrates an OSNR penalty before compensation for a phase distortion and an OSNR penalty after the compensation for the phase distortion, when an optical transmitting apparatus 100 performs DP-QPSK modulation of an optical signal using an RZ pulse of 66%.

Referring to FIG. 6, when a drive amplitude imbalance of the RZ pulse carver 120 increases, the OSNR penalty before compensation may dramatically increase. In a case where compensation for the distortion is performed, even through the drive amplitude imbalance increases, an increasing rate of the OSNR penalty may be low. Although the RZ pulse of 66% may be used as an example in FIG. 6, the described embodiment may be applicable to a phase modulation using an RZ pulse of 33% or an RZ pulse of 50%.

Figure 7:
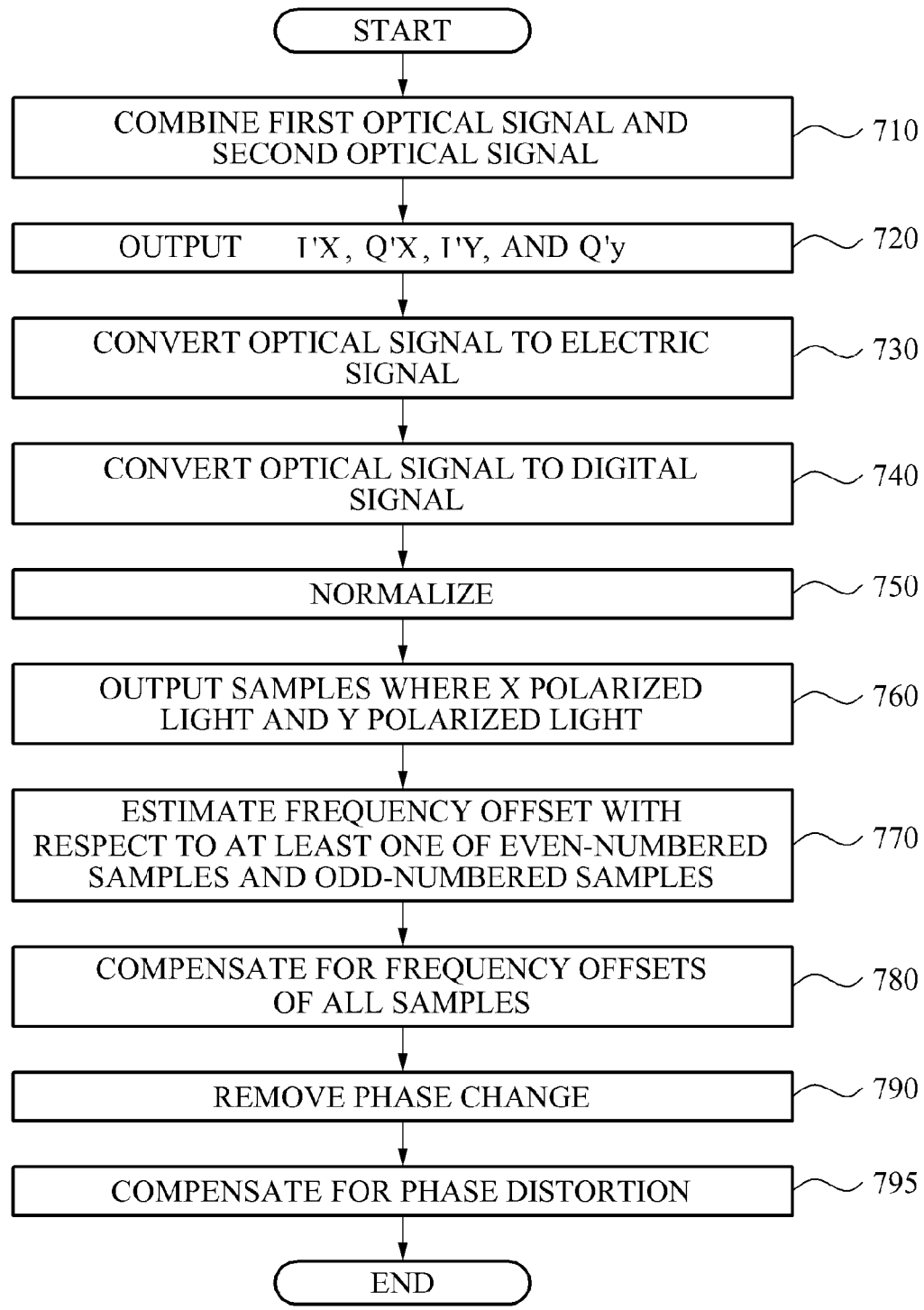
FIG. 7 is a flowchart illustrating an optical signal processing method of a coherent optical receiving apparatus according to an embodiment of the present invention.

FIG. 7 illustrates an optical signal processing method of a coherent optical receiving apparatus according to an embodiment of the present invention.

The optical signal processing method of FIG. 7 may be performed by the coherent optical receiving apparatus 300 described with reference to FIG. 3.

In operation 710, an optical hybrid unit of the coherent optical receiving apparatus may combine a first optical signal inputted from an optical transmitting apparatus and a second optical signal inputted from a local oscillator.

In operation 720, the optical hybrid unit of the coherent optical receiving apparatus may separate the combined signal into an in-phase channel component including an x polarized light and y polarized light and a quadrature phase channel component including an x polarized light and y polarized light.

In operation 730, the coherent optical receiving apparatus may convert an optical signal outputted in operation 720 to an electric signal.

In operation 740, the coherent optical receiving apparatus may convert an optical signal outputted in operation 730 to a digital signal.

In operation 750, the coherent optical receiving apparatus may normalize the digital signal inputted from operation 740.

In operation 760, the coherent optical receiving apparatus may demultiplex the normalized signal and may output samples where an x polarized light and a y polarized light are separated from each other. The outputted samples may be a signal where the x polarized light and the y polarized light are separated from each other, and may be constituted by Ix, Qx, Iy, and Qy.

In operation 770, the coherent optical receiving apparatus may estimate at least one of a frequency offset of even-numbered samples and a frequency offset of odd-numbered samples. The coherent optical receiving apparatus may estimate a frequency offset of even-numbered samples by calculating, based on Equation 1, an average of phase changes occurring in the even-numbered samples, and by dividing the calculated average number of phase changes by an even-numbered sample interval. The coherent optical receiving apparatus may estimate a frequency offset of odd-numbered samples by calculating, based on Equation 2, an average of phase changes occurring in the odd-numbered samples, and by dividing the calculated average number of phase changes by an odd-numbered sample interval.

In operation 780, the coherent optical receiving apparatus may compensate for a frequency offset of all samples using at least one estimated frequency offset based on at least one of Equation 1 and Equation 2. All samples may include the even-numbered samples and the odd-numbered samples. When both frequency offsets estimated based on Equation 1 and Equation 2 are used, an average value of the two frequency offsets may be calculated, and compensation for the frequency offset of all the samples may be performed based on the calculated average value.

In operation 790, the coherent optical receiving apparatus may remove a number of a phase changes generated due to linewidth of laser from the signal for which compensation for the frequency offset is performed.

In operation 795, the coherent optical receiving apparatus may compensate for a phase distortion occurring due to the optical transmitting apparatus, with respect to the sample where the number of the phase changes is removed and compensation for the frequency offset is performed.

The coherent optical receiving apparatus may respectively estimate the frequency offset of the even-numbered sample and the frequency offset the odd-numbered sample and thus, may accurately estimate the frequency offset and may compensate for the phase distortion.

Figure 8:
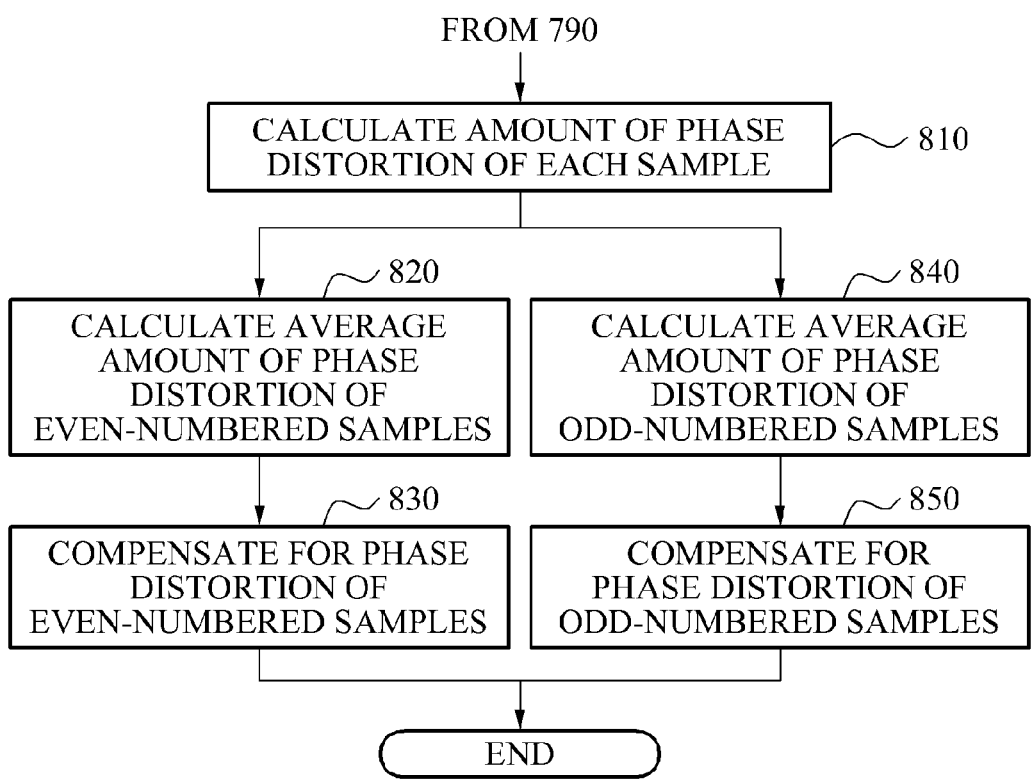
FIG. 8 is a flowchart illustrating processes of compensating for phase distortion, of FIG. 7.

FIG. 8 illustrates processes of operation 795 of compensating for phase distortion, of FIG. 7.

In operation 810, the coherent optical receiving apparatus may calculate an amount of phase distortion occurring in each sample based on Equation 3.

In operation 820, the coherent optical receiving apparatus may calculate, based on Equation 4, an average amount of phase distortions occurring in even-numbered samples from among the amount of phase distortions calculated for respective samples.

In operation 830, the coherent optical receiving apparatus may compensate for the phase distortions of the even-numbered samples based on the average amount of phase distortions calculated in operation 830.

In operation 840, the coherent optical receiving apparatus may calculate an average amount of phase distortions occurring in odd-numbered samples, based on Equation 5.

In operation 850, the coherent optical receiving apparatus may compensate for the phase distortions of the odd-numbered samples based on the average amount of the phase distortions calculated in operation 840.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A coherent optical receiving apparatus, the apparatus comprising:
    an optical hybrid unit to generate an optical signal by combining a first optical signal inputted from an optical transmitting apparatus and a second optical signal inputted from a local oscillator;
    a polarization demuxer to demultiplex the optical signal generated from the optical hybrid unit to output samples where an x polarized light and a y polarized light are separated from each other;
    a frequency offset compensator to estimate at least one frequency offset of at least one of even-numbered samples and odd-numbered samples from among the samples outputted by the polarization demuxer, and to compensate for a frequency offset of the even-numbered samples and a frequency offset of the odd-numbered samples using the at least one estimated frequency offset; and
    a carver distortion compensator to compensate for phase distortions of the samples for which the compensation for the frequency offset is performed, the phase distortions being generated by the optical transmitting apparatus.

2. The apparatus of claim 1, wherein the frequency offset compensator estimates a frequency offset of the even-numbered samples, based on an average of phase changes generated by the even-numbered samples, and estimates a frequency offset of the odd-numbered samples, based on an average of phase changes generated by the odd-numbered samples.

3. The apparatus of claim 1, wherein the frequency offset compensator estimates a frequency offset of the even-numbered samples and a frequency offset of the odd-numbered samples, and compensates for the frequency offset of the even-numbered samples and the frequency offset of the odd-numbered samples, based on an average value of the estimated frequency offset of the even-numbered samples and the estimated frequency offset of the odd-numbered samples.

4. The apparatus of claim 1, wherein the carver distortion compensator compensates for phase distortions with respect to the even-numbered samples and phase distortions with respect to the odd-numbered samples.

5. The apparatus of claim 4, wherein the carver distortion compensator compensates for the phase distortions with respect to the even-numbered samples, based on an average amount of the phase distortions calculated with respect to the even-numbered samples, and compensates for the phase distortions with respect to the odd-numbered sample, based on an average amount of the phase distortions calculated with respect to the odd-numbered samples.

6. The apparatus of claim 1, wherein the carver distortion compensator compensates for a phase distortion generated by a return-to-zero (RZ) pulse carver of the optical transmitting apparatus.

7. The apparatus of claim 1, wherein the optical hybrid unit outputs, to the polarization demuxer, the optical signal where the x polarized light and the y polarized light not separated.

8. The apparatus of claim 1, wherein the samples outputted from the polarization demuxer includes an in-phase channel component where the x polarized light and the y polarized light are separated from each other, and includes an quadrature phase channel component where the x polarized light and the y polarized light are separated from each other.

9. An optical signal processing method of a coherent optical receiving apparatus, the method comprising:
    generating an optical signal by combining a first optical signal inputted from an optical transmitting apparatus and a second optical signal inputted from a local oscillator;
    outputting samples where an x polarized light and a y polarized light are separated from each other by demultiplexing the generated optical signal;
    estimating at least one frequency offset of at least one of even-numbered samples and odd-numbered samples from among the outputted samples;
    compensating for a frequency offset of the even-numbered samples and a frequency offset of the odd-numbered samples using the at least one estimated frequency offset; and
    compensating for phase distortions of the samples for which the compensation for the frequency offset is performed, the phase distortions being generated by the optical transmitting apparatus.

10. The method of claim 9, wherein the estimating comprises:
    estimating a frequency offset of the even-numbered samples, based on an average of phase changes generated by the even-numbered samples, and estimating a frequency offset with respect to the odd-numbered samples, based on an average of phase changes generated by the odd-numbered samples.

11. The method of claim 9, wherein the compensating comprises:

estimating a frequency offset of the even-numbered samples and a frequency offset of the odd-numbered samples; and compensating for the frequency offset of the even-numbered samples and the frequency offset of the odd-numbered samples, based on an average value of the estimated frequency offset of the even-numbered sample and the estimated frequency offset of the odd-numbered samples.

12. The method of claim 9, wherein the compensating comprises:

compensating for phase distortions with respect to the even-numbered samples and phase distortions with respect to the odd-numbered samples.

13. The method of claim 12, wherein the compensating comprises:

compensating for the phase distortions with respect to the even-numbered samples, based on an average amount of the phase distortions calculated with respect to the even-numbered samples, and compensating for the phase distortions with respect to the odd-numbered sample, based on an average amount of the phase distortions calculated with respect to the odd-numbered samples.

14. The method of claim 9, wherein the compensating comprises:

compensating for a phase distortion generated by a return-to-zero (RZ) pulse carver of the optical transmitting apparatus.

* * * * *